United States Patent
Obliger et al.

(10) Patent No.: US 12,193,597 B2
(45) Date of Patent: Jan. 14, 2025

(54) BEVERAGE PREPARATION MACHINE WITH MANUALLY OPERATED PUMP WITH FLOW CONTROL MEANS

(71) Applicant: SOCIETE DES PRODUITS NESTLE S.A., Vevey (CH)

(72) Inventors: Nicolas Obliger, Franey (FR); Marco Magatti, Lausanne (CH)

(73) Assignee: Societe des Produits Nestle S.A., Vevey (CH)

( * ) Notice: Subject to any disclaimer, the term of this patent is extended or adjusted under 35 U.S.C. 154(b) by 466 days.

(21) Appl. No.: 16/624,154

(22) PCT Filed: Jun. 18, 2018

(86) PCT No.: PCT/EP2018/066040
§ 371 (c)(1),
(2) Date: Dec. 18, 2019

(87) PCT Pub. No.: WO2018/234203
PCT Pub. Date: Dec. 27, 2018

(65) Prior Publication Data
US 2020/0221897 A1    Jul. 16, 2020

(30) Foreign Application Priority Data
Jun. 22, 2017   (EP) .................................... 17177285

(51) Int. Cl.
*A47J 31/38* (2006.01)
*A47J 31/00* (2006.01)
(Continued)

(52) U.S. Cl.
CPC ............. *A47J 31/38* (2013.01); *A47J 31/005* (2013.01); *A47J 31/3676* (2013.01); *A47J 31/461* (2018.08); *A47J 31/468* (2018.08)

(58) Field of Classification Search
CPC ........ A47J 31/38; A47J 31/3676; A47J 31/36; A47J 31/005; A47J 31/0652; A47J 31/461;
(Continued)

(56) References Cited

U.S. PATENT DOCUMENTS 2,666,379 A  *  1/1954  Kaminky .............. A47J 31/007
                                              122/504
2,827,845 A  *  3/1958  Richeson .............. A47J 31/007
                                              99/302 R
(Continued)

FOREIGN PATENT DOCUMENTS

EP    2622997    8/2013
EP    2742833    6/2014
(Continued)

OTHER PUBLICATIONS

Japan Patent Office Communication for Application No. 2019-569431, Dispatch No. 285933, Dispatch Date Jun. 21, 2022, 4 pages.

*Primary Examiner* — Dana Ross
*Assistant Examiner* — Adam M Eckardt
(74) *Attorney, Agent, or Firm* — K&L Gates LLP

(57) ABSTRACT

The invention relates to a beverage preparation machine (20) for providing a pressurized liquid to a dose of beverage ingredients (10) such as a coffee capsule, the machine comprising a pressurizing liquid chamber (1) designed for being filled with a predefined amount of liquid upon operation of a liquid pump (2) connected to a liquid reservoir (3) of the machine, a potential energy accumulator (4) that is associated to the pressurizing liquid chamber (1) and which is designed for being brought into a charged position upon filling of the pressurizing liquid chamber (1), a brewing chamber (5) for receiving the dose of beverage ingredients (10) and which is designed for being selectively brought in
(Continued)

fluid communication with the pressurizing liquid chamber (1), the machine (20) further comprising flow control means (6a,6b) designed for regulating the amount of liquid conveyed from the liquid pump (2) into the pressurizing liquid chamber (1) depending on an operating position of the potential energy accumulator (4) and/or on the pressure of liquid in the pressurizing chamber (1).

11 Claims, 9 Drawing Sheets

(51) Int. Cl.
    *A47J 31/36*     (2006.01)
    *A47J 31/46*     (2006.01)

(58) Field of Classification Search
    CPC .... A47J 31/468; A47J 31/469; A47J 31/3695; A47J 31/3633; A47J 31/369; A47J 31/56; A47J 31/3609; A47J 31/3614; A47J 31/3619; A47J 31/4403; A47J 31/057; A47J 31/3685; A47J 31/46; A47J 31/32; A47J 31/3628; A47J 31/407; A47J 31/44; A47J 31/465; A47J 31/525; A47J 31/00; A47J 31/40; A47J 31/54; A47J 31/02; A47J 31/06; A47J 31/10; A47J 31/24; A47J 31/60; A23F 5/26; A23F 5/262; A23F 3/18; B05C 11/10; B65D 85/8043; B65D 85/804; B67D 7/645; B67D 99/297; A23L 2/52

See application file for complete search history.

(56) References Cited

U.S. PATENT DOCUMENTS

| | | | | | |
|---|---|---|---|---|---|
| 3,031,947 | A | * | 5/1962 | Heuckeroth | A47J 31/56 99/283 |
| 3,955,485 | A | * | 5/1976 | Stasse | A47J 31/24 99/287 |
| 4,763,566 | A | * | 8/1988 | Paoletti | A47J 31/24 D7/312 |
| 5,778,765 | A | * | 7/1998 | Klawuhn | A47J 31/469 99/290 |
| 5,842,407 | A | * | 12/1998 | Schmed | A47J 31/54 99/290 |
| 6,019,028 | A | * | 2/2000 | Schmed | A47J 31/542 99/290 |
| 6,405,637 | B1 | * | 6/2002 | Cai | A47J 31/469 99/305 |
| 7,398,726 | B2 | * | 7/2008 | Streeter | A47J 31/56 99/305 |
| 7,966,927 | B2 | * | 6/2011 | Yoakim | A47J 31/36 99/302 R |
| 8,387,516 | B1 | * | 3/2013 | Reynolds | A47J 31/56 99/305 |
| 9,154,547 | B2 | * | 10/2015 | Kuempel | A47J 31/52 |
| 9,668,607 | B2 | * | 6/2017 | Bruinsma | A47J 31/4489 |
| 9,883,765 | B2 | * | 2/2018 | Samsó Besora | A23F 5/26 |
| 10,258,187 | B2 | * | 4/2019 | Duvall | A47J 31/545 |
| 10,856,689 | B2 | * | 12/2020 | Samsó Besora | A23F 5/26 |
| 11,045,042 | B2 | * | 6/2021 | Vetterli | A47J 31/52 |
| 11,344,148 | B2 | * | 5/2022 | Itzkowitz | A47J 31/24 |
| 2005/0172818 | A1 | * | 8/2005 | Hunt | A47J 31/38 99/279 |
| 2006/0107839 | A1 | * | 5/2006 | Nenov | A47J 31/36 99/275 |
| 2008/0092747 | A1 | * | 4/2008 | Yoakim | A47J 31/005 99/295 |
| 2008/0276807 | A1 | * | 11/2008 | Righetti | A47J 31/469 99/302 R |
| 2008/0302252 | A1 | * | 12/2008 | O'Brien | A47J 31/32 99/302 R |
| 2010/0018404 | A1 | * | 1/2010 | Villa | A47J 31/469 99/295 |
| 2011/0200726 | A1 | * | 8/2011 | Tinkler | A47J 31/3676 426/431 |
| 2012/0017767 | A1 | * | 1/2012 | Samso Besora | A47J 31/38 99/302 R |
| 2012/0240783 | A1 | * | 9/2012 | Daburger | A47J 31/461 137/197 |
| 2012/0266755 | A1 | * | 10/2012 | Baudet | A47J 31/3633 99/295 |
| 2013/0330453 | A1 | * | 12/2013 | Doglioni Majer | A47J 31/4403 99/323 |
| 2014/0242224 | A1 | * | 8/2014 | Glucksman | A47J 31/32 99/280 |
| 2014/0299000 | A1 | * | 10/2014 | Hanneson | A47J 31/3695 99/323 |
| 2014/0356500 | A1 | * | 12/2014 | Baudet | A23L 2/52 426/425 |
| 2015/0157168 | A1 | * | 6/2015 | Burrows | A47J 31/462 426/433 |
| 2015/0201796 | A1 | * | 7/2015 | Kuempel | A47J 31/52 99/283 |
| 2015/0327712 | A1 | * | 11/2015 | Samsó Besora | A47J 31/38 99/297 |
| 2016/0007798 | A1 | * | 1/2016 | Jimenez | A47J 31/56 99/283 |
| 2016/0043559 | A1 | * | 2/2016 | Nabeiro | A47J 31/005 307/18 |
| 2016/0296065 | A1 | * | 10/2016 | Doglioni Majer | A47J 31/5253 |
| 2016/0338527 | A1 | * | 11/2016 | Burrows | A47J 31/56 |
| 2017/0290458 | A1 | * | 10/2017 | Burrows | A47J 31/3628 |
| 2018/0153338 | A1 | * | 6/2018 | Mangold | A47J 31/106 |
| 2018/0177328 | A1 | * | 6/2018 | Fin | A47J 31/469 |
| 2019/0053656 | A1 | * | 2/2019 | Locher | A47J 31/542 |
| 2019/0328170 | A1 | * | 10/2019 | Cai | A47J 31/52 |
| 2019/0350402 | A1 | * | 11/2019 | Steber | A47J 31/468 |
| 2020/0093316 | A1 | * | 3/2020 | Hilckmann | A47J 31/3633 |
| 2020/0221897 | A1 | * | 7/2020 | Obliger | A47J 31/461 |
| 2020/0352389 | A1 | * | 11/2020 | De Vries | A47J 31/469 |
| 2021/0059466 | A1 | * | 3/2021 | Mueller | A47J 31/465 |
| 2021/0106167 | A1 | * | 4/2021 | Crozier | A47J 31/58 |
| 2021/0127892 | A1 | * | 5/2021 | Crozier | A47J 31/58 |
| 2021/0228016 | A1 | * | 7/2021 | Heuberger | A47J 31/36 |

FOREIGN PATENT DOCUMENTS

| | | | | | |
|---|---|---|---|---|---|
| EP | 2742833 | A1 | | 6/2014 | ............ A23F 5/26 |
| EP | 3500141 | B1 | * | 3/2020 | ........... A47J 31/002 |
| ES | 2553393 | T3 | * | 12/2015 | .......... A47J 31/0647 |
| JP | H0551215 | U | | 7/1993 | |
| WO | WO-2010015743 | A1 | * | 2/2010 | ............ A47J 31/46 |
| WO | WO-2013113972 | A1 | * | 8/2013 | ............ A47J 31/36 |
| WO | 2013149492 | | | 10/2013 | |
| WO | WO-2014096490 | A1 | * | 6/2014 | ............ A23F 5/26 |
| WO | WO-2015073732 | A1 | * | 5/2015 | ............ A23F 5/262 |
| WO | WO-2018189073 | A1 | * | 10/2018 | ........... A47J 31/005 |
| WO | WO-2021130539 | A1 | * | 7/2021 | ........... A47J 31/461 |

\* cited by examiner

BEVERAGE PREPARATION MACHINE WITH MANUALLY OPERATED PUMP WITH FLOW CONTROL MEANS

CROSS REFERENCE TO RELATED APPLICATIONS

The present application is a National Stage of International Application No. PCT/EP2018/066040, filed on Jun. 18, 2018, which claims priority to European Patent Application No. 17177285.8, filed on Jun. 22, 2017, the entire contents of which are being incorporated herein by reference.

FIELD OF THE INVENTION

The present invention relates to a beverage preparation machine for providing pressurized liquid to a brewing chamber using a manual pump for filling a pressurizing liquid chamber with liquid from a reservoir, the machine comprising flow control means for controlling the liquid conveyed from the pump into the pressurizing liquid chamber during the filling process of the chamber.

BACKGROUND AND OBJECT OF THE INVENTION

Beverage preparation machines for autonomously preparing a beverage, i.e. without an electrically driven pump provided in the machine, are already available on the market.

In these machines, the required liquid pressure of at least about 5-20 bars for preparing beverages such as in particular an espresso coffee is provided by alternative means to an electrically driven pressure pump provided in stationary beverage preparation machines. In particular, these machines comprise a manually operated pump which is e.g. driven by a reciprocating movement of a dedicated lever arrangement. These machines further comprise a potential energy accumulator designed for being charged upon actuation of the lever arrangement and which may selectively release the accumulated energy such as to provide pressurized liquid to a brewing chamber of the machine in which a portion of beverage ingredients, e.g. provided in an ingredients containing capsule, is arranged. The pressurized liquid is then made to interact with the provided ingredients in order to form the beverage.

EP 2 622 997 A1 and EP 2 742 833 A1 for example relate to a beverage preparation machine comprising a potential energy accumulator designed for releasing energy to a liquid chamber such that liquid may be released to a brewing chamber of the machine under high pressure without requiring an electrically driven high pressure pump. The energy accumulator is designed to be compressed and thus charged by pumping liquid from a reservoir to the liquid chamber upon reciprocating movement of a lever arrangement connected to a pump of the machine. When the liquid chamber is completely filled, the liquid can be selectively released under pressure from the liquid chamber by means of a valve arranged between the liquid chamber and the brewing chamber.

The known beverage preparation machines suffer the disadvantage that in case the liquid chamber associated to the potential energy accumulator is completely filled with liquid provided by the pump and the accumulator is consequently in its charged position, the pump remains filled with liquid and the lever arrangement can no longer be moved. The lever arrangement thus remains in a fixed but yet undefined position with respect to a housing of the machine. Due to this undefined position, a reliable feedback for the user regarding a fully charged state of the accumulator cannot be provided. Further, handling of the machine with the lever arrangement protruding from the housing in an undefined direction during beverage preparation is rather cumbersome.

The present invention seeks to address the above-described problems. The invention also aims at other objects and particularly the solution of other problems as will appear in the rest of the present description.

SUMMARY OF THE INVENTION

The present invention relates to a beverage preparation machine for providing a pressurized liquid to a dose of beverage ingredients such as in particular a beverage ingredients containing capsule or cartridge, the machine comprising a pressurizing liquid chamber designed for being filled with a predefined amount of liquid upon operation of a liquid pump connected to a liquid reservoir of the machine, a potential energy accumulator that is associated to the pressurizing liquid chamber and which is designed for being brought into a charged position upon filling of the pressurizing liquid chamber, a brewing chamber for receiving the dose of beverage ingredients and which is designed for being selectively brought in fluid communication with the pressurizing liquid chamber, the machine further comprising flow control means designed for regulating the amount of liquid conveyed from the liquid pump into the pressurizing liquid chamber according to at least two flow control modes depending on the filling state of the pressurized chamber. The at least two flow control modes preferably comprise a first flow control mode in which liquid is conveyed from the pump into the pressurizing chamber and a second flow control mode in which the liquid is conveyed from the liquid pump back into the liquid reservoir of the machine.

Accordingly to the invention, the amount of liquid conveyed by the pump can be set by the flow control means dependent on the filling state of the pressurizing chamber, which may depend, in particular, on the operating state of the potential energy accumulator or on the operating position of the potential energy accumulator or on the pressure in the pressurizing chamber or on combinations of such operating states.

For example, this enables that in case the energy accumulator is e.g. in its charged position, the amount of liquid conveyed by an operation of the pump is set different than in another operation state or position of the energy accumulator. Accordingly, even in case the energy accumulator is in its charged position that preferably corresponds to a filled pressurizing chamber, the pump may still be operated without further conveying liquid into the pressurizing liquid chamber. Also a lever arrangement or motorized driving arrangement connected to the pump and designed for driving the pump can still be operated or run. Therefore, even in case the pressurizing chamber is filled and the energy accumulator is in its charged position, the lever arrangement can still be returned to a rest position in which the lever arrangement is for example flush with or retracted in a housing of the machine. The mechanical constraints on the lever arrangement and linkage to the pump can be controllably reduced. Similarly, control of the motorized driving arrangement can be simplified as such arrangement can still be running without exerting excessive pressure or mechanical constraints on the system.

The flow control means preferably enable an operation of the liquid pump in the charged position of the potential energy accumulator and thus in the filled state of the pressurizing liquid chamber without further filling of the pressurizing liquid chamber.

The pressurizing liquid chamber of the machine is designed for being filled with a predefined amount of liquid upon operation of a liquid pump. For this purpose, the liquid chamber is preferably in fluid connection to the pump and the liquid reservoir of the machine. The pressurizing liquid chamber is of variable size. It preferably comprises a first cylinder and plunger assembly. The first cylinder and plunger assembly may be moved relative to each other in order to define at least an empty and filled state of the pressurizing liquid chamber. During operation of the pump, the pressurizing liquid chamber will continuously to be filled by liquid conveyed from the reservoir until the filled state of the pressurizing liquid chamber is reached.

The pressurizing liquid chamber is functionally associated to the energy accumulator of the machine. Accordingly, the energy accumulator is preferably designed to interact with the pressurizing liquid chamber in particular to pressurize a liquid held in the pressurizing liquid chamber, e.g. by means of compression of a fluid held within the energy accumulator.

The energy accumulator of the machine preferably comprises a second cylinder and plunger assembly defining a chamber of variable size dependent on the position of the plunger within the cylinder. The chamber of the energy accumulator preferably houses a compressible fluid preferably gas and/or a compressible mechanical spring. The amount of gas provided in the chamber or the spring load may be adaptable in order to adjust the compression forces of the energy accumulator of the machine.

The operating positions of the energy accumulator relate to the relative positions of the second cylinder and the second plunger and preferably comprise the already mentioned charged position of the energy accumulator and at least a non-charged position. The charged position of the energy accumulator preferably relates to a state in which the second cylinder and plunger assembly are arranged in order to define a minimum size of the chamber for housing the compressible gas. The non-charged position preferably relates to a state in which the second cylinder and plunger assembly are arranged in order to define a maximum size of the chamber for housing the compressible gas. During operation of the pump, the gas of the energy accumulator is preferably continuously compressed in the chamber until the charged position of the energy accumulator is reached.

In a preferred embodiment, the plunger of the first cylinder and plunger assembly is preferably susceptible of accumulating in the charged position potential energy from the compression force applied to the fluid housed inside the chamber of the second cylinder and plunger assembly. The first plunger is thus preferably designed to transmit pressure to the liquid held within the pressurizing liquid chamber. Upon bringing the pressurizing liquid chamber in fluid communication with the brewing chamber of the machine, pressurized liquid may then interact with the dose of ingredients held within the brewing chamber.

In a preferred embodiment, the cylinder of the second cylinder and plunger assembly is coaxially placed inside the cylinder of the first cylinder and plunger assembly, the plunger of the first assembly being susceptible of retracting inside its cylinder to move the cylinder of the second assembly when the plunger of the second assembly remains fixed to compress the fluid inside the chamber.

In a preferred embodiment, the plunger rod of the second assembly is preferably coaxially placed inside the plunger rod of the first assembly, the rod of the first assembly being susceptible of being moved on the rod of the second assembly to retract the plunger of the first assembly.

The flow control means of the machine preferably comprise a system of at least two valves arranged in a fluid path between the liquid reservoir and the pressurizing chamber.

In a preferred embodiment, a first valve of the flow control means is preferably situated in a fluid path between the pump and the liquid reservoir and a second valve of the flow control means is situated in a fluid path between the first valve and the pressurizing liquid chamber.

The first valve is preferably a one-way valve, such as a pin valve, preferably situated in a T-junction of the fluid circuit of the machine. The valve is preferably designed to selectively enable a fluid connection from the reservoir to the pump as well as from the pump to a fluid path in which the second valve is located.

The second valve is preferably a one-way valve such as a ball check valve.

The first and second valves are preferably designed for a reciprocating movement within their respective valve seats in order to enable a preferred fluid movement within the fluid circuit of the machine.

In a first mode, the first valve of the flow control means is preferably designed for being selectively engaged and held in a forced open position in the charged position of the potential energy accumulator which position preferably corresponds to the filled state of the pressurizing liquid chamber. Thereby, the first valve may be mechanically engaged by a part of the potential energy accumulator and/or the pressurizing liquid chamber. For example the first valve may be designed for being engaged by an outer lateral engagement surface of the plunger of the first plunger and cylinder assembly. The lateral engagement surface may be curved or wedged outer surface of the plunger interacting with a protruding pinhead of the first valve.

The forced open position of the first valve of the flow control means preferably enables a fluid communication solely between the liquid reservoir and the liquid pump. In said forced open position, liquid may thus only be pumped between the liquid reservoir and the pump respectively a pumping chamber of the pump.

In a second mode, the flow control means comprise a third valve. The valve is preferably arranged to direct liquid back to the liquid reservoir when the pressure between the liquid pump and the pressurized chamber exceeds a given threshold and/or the pressurized chamber is sufficiently filled. The third valve is a one-way valve arranged to by-pass the first valve in the direction towards the liquid reservoir. The third valve may also be a ball check valve. The third valve is arranged to open at a pressure or load which is higher than the pressure or load of the second valve of the regulating means. This enables to regulate automatically the flow back to the liquid reservoir once the pressure increases sufficiently as the pressurized chamber is filled and the energy accumulator is charged.

The liquid pump of the machine is a manually operated pump, i.e. preferably without any electrical driving means. The pump may be formed by a third cylinder and plunger assembly which may enclose a pumping chamber of variable size. In a preferred embodiment, the liquid pump comprises two cylinders and two plungers associated thereto.

The liquid pump is preferably designed for being driven by a manually operated lever arrangement. The lever arrangement is preferably designed for operating the pump by a reciprocating movement of the lever with respect to a housing of the machine.

In a preferred embodiment, the lever arrangement is fixedly connected to the pump, preferably to a movable plunger or cylinder of the pump. The lever arrangement may comprise a knee-lever mechanism for transmitting e.g. a reciprocating movement of the lever arrangement to a plunger of the pump in order to drive the pump. The lever arrangement is preferably designed for directly transmitting even stronger forces directly to the liquid pump. In particular, the lever arrangement is preferably void of a slip clutch or the like.

The liquid reservoir of the machine is preferably designed for storing liquid at an atmospheric pressure. The liquid reservoir may include means for heating the liquid inside the tank e.g. by means of resistors, induction or radiation means. The liquid reservoir may as well comprise an overpressure valve such as e.g. a check valve.

The machine preferably further comprises a release valve arranged between the pressurizing liquid chamber and the brewing chamber and which is designed for selectively releasing pressurized water from the pressurizing liquid chamber to the brewing chamber. Accordingly, pressurized liquid may selectively be provided to the brewing chamber, e.g. after a dose of beverage ingredients has been put into the brewing chamber.

The machine preferably further comprises a beverage outlet for enabling the draining of the resulting beverage from the beverage brewing chamber to e.g. a receptacle such as a coffee mug.

The dose of beverage ingredients is preferably an open or closed beverage ingredients containing capsule or cartridge as known in the present technical field. The brewing chamber is thus preferably adapted for receiving and housing a dedicated capsule.

A capsule for being used with the present beverage preparation machine may comprise in particular ground coffee for preparing a coffee beverage, preferably an espresso beverage, upon interaction of the pressurized liquid with the ingredients provided in the capsule. The capsule may as well comprise alternative or additional ingredients such as e.g. soluble coffee, tea leaves etc.

BRIEF DESCRIPTION OF THE FIGURES

Further features, advantages and objects of the present invention will become apparent for a skilled person when reading the following detailed description of embodiments of the present invention, when taken in conjunction with the figures of the enclosed drawings.

DETAILED DESCRIPTION OF THE FIGURES

Figure 1:
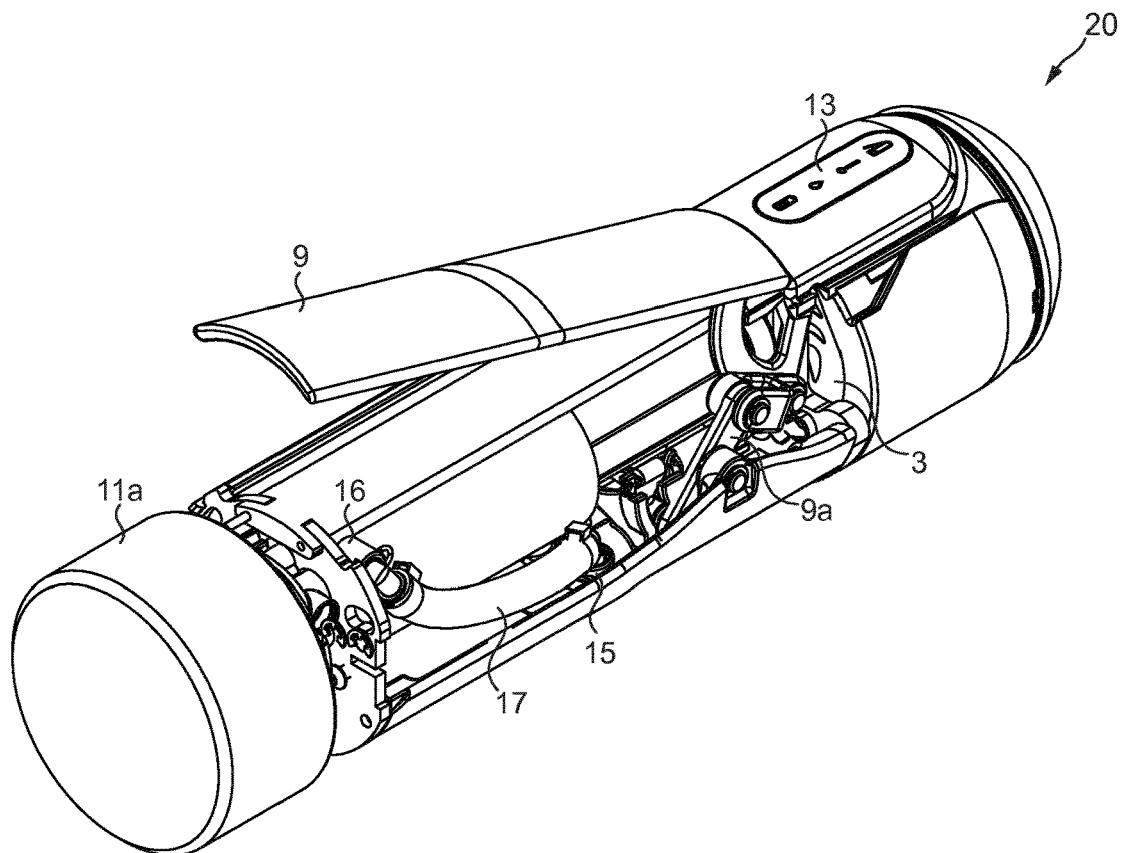
FIG. 1 is a perspective side view of a preferred embodiment of the beverage preparation machine (with part of the housing 11 removed) according to the invention.

With respect to FIGS. 1 to 3b, a preferred of the beverage preparation machine 20 according to the present invention will be described. The machine 20 is preferably a portable beverage preparation machine such as in particular a portable espresso machine. However, the invention also applies to a non-portable machine such as a table top coffee machine.

The machine 20 is designed for providing a pressurized liquid to a dose of beverage ingredients such as a coffee capsule 10 that may be selectively placed into a brewing chamber 5 of the machine. The brewing chamber 5 is thus preferably adapted for receiving and housing such coffee capsule. The coffee capsule may be placed into the brewing chamber 5 by removing a lid 11a from a housing 11 of the machine. The lid 11a may be connected via a screw or ramp-type (e.g., quarter turn) connection to the machine 20. The housing 11 is preferably of essentially cylindrical form and may comprise a beverage outlet (not shown) for the resulting beverage to be drained from the brewing chamber e.g. into a receptacle such as a coffee mug.

The machine 20 may comprise a user interface 13 that may comprise at least a main switch and/or feedback indicators relating to different operational modes of the machine. For example, the user interface may comprise status indicators for the liquid heating temperature and a position status of the energy accumulator (such as Reed sensors).

Figure 2:
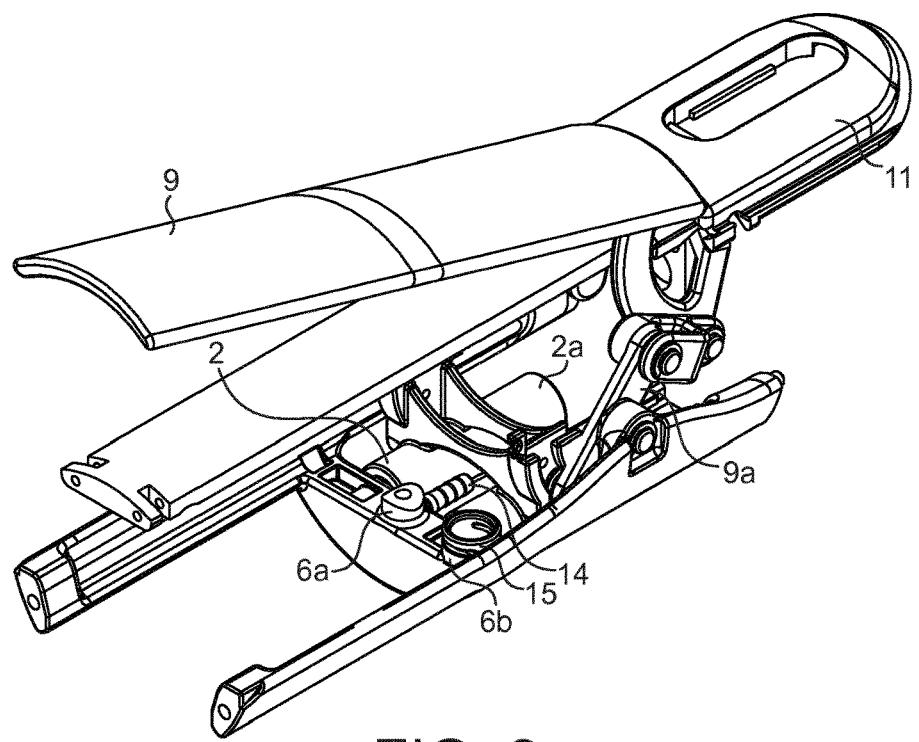
FIG. 2 is a perspective side partial view of the machine in particular showing a lever arrangement and flow control means of the machine according to FIG. 1.
Figure 7A:
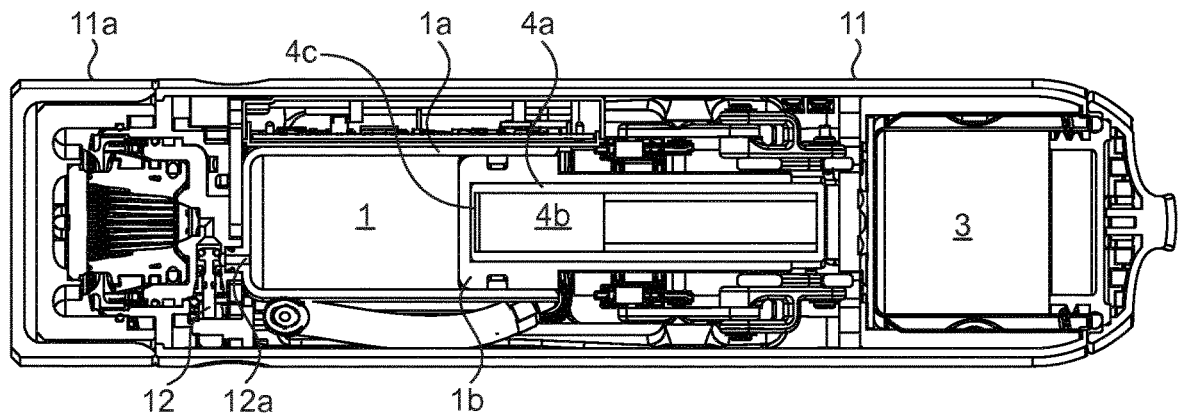
FIGS. 7a and 7b are cross sectional side views of the machine and show a release valve of the machine.
Figure 7B:
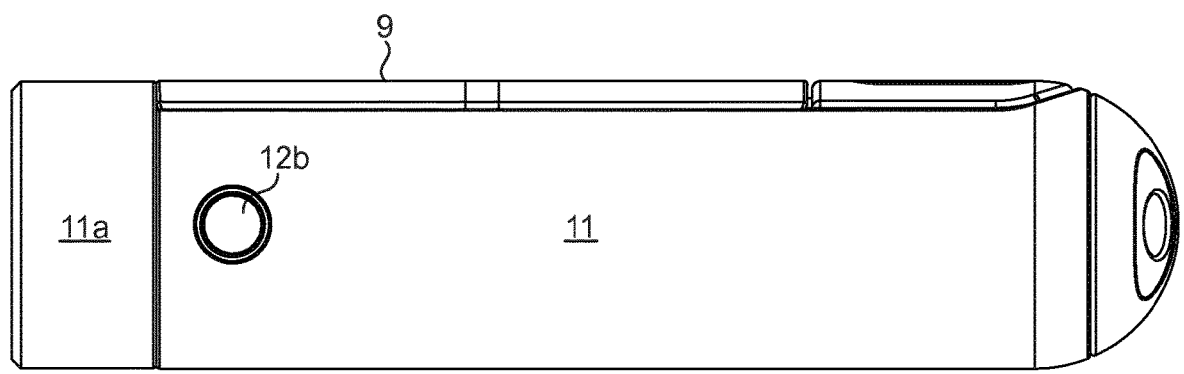

The machine 20 comprises a manually operated liquid pump 2 that is preferably driven by a lever arrangement 9 connected to the pump. The lever arrangement 9 may linked to the housing 11 of the machine. The lever arrangement 9 is preferably designed for being operated in reciprocating movement away and towards the housing 11 of the machine 20. In the state as shown in FIGS. 1 and 2 the lever arrangement protrudes from the housing 11 of the machine. In the state as shown in FIGS. 7a, 7b, the lever arrangement 9 is fully retracted and thus essentially flush with the rest of the machine housing 11. The lever arrangement is preferably hinged to the housing 11 of the machine and may comprise a knee lever 9a connecting the lever arrangement 9 to the liquid pump 2 preferably to a movable cylinder 2a guided about a fixed plunger of the pump 2. Of course, the arrangement can be inverted with the lever 9a being connected to a movable plunger 2a in a fixed cylinder of the pump 2. The knee-lever arrangement 9a may be further mechanically arranged with the pump to activate the pump, i.e., cylinder or plunger, only after a minimal angular displacement of the lever, e.g., 5-10 degrees, is attained from the fully retracted position (at a reference of zero degree) so as to leave room for handling the lever properly before effectively starting the pumping action. Of course, the lever arrangement can be symmetrical about the longitudinal plane of the machine in that it comprises a pair of levers 9a; each one linked to a cylinder 2a of the pump.

The machine 20 further comprises a liquid reservoir 3 in fluid connection to the pump 2 and for holding a predefined amount of liquid at (about) atmospheric pressure. The liquid reservoir 3 is preferably designed for being refilled via a dedicated filling duct. The liquid reservoir 3 may further comprise an overpressure valve 18. Further, the liquid reservoir 3 may comprise integrated heating means (not shown) such as e.g. resistors, induction or radiation means designed for heating the liquid held therein to a desired temperature. The heating means may be battery driven. For this purpose, the machine may comprise a preferably re-chargeable energy source such as an integrated battery.

The machine 20 further comprises a pressurizing liquid chamber 1 designed for being filled with a predefined amount of liquid upon operation of the liquid pump 2. The pressurizing liquid chamber 1 is thus at least in fluid communication with the pump 2 of the machine. The pressurizing liquid chamber 1 is formed by a first cylinder and plunger assembly 1a,1b which may be moved with respect to each other in order to vary the size of the liquid chamber 1 enclosed therein.

The machine further comprises a potential energy accumulator 4 preferably comprising a gaseous fluid or spring and which energy accumulator is associated to the pressurizing liquid chamber 1. The energy accumulator 4 is designed for being brought from a non-charged position (see FIG. 3a) into a charged position (see FIG. 3b) upon filling of the pressurizing liquid chamber 1. The energy accumulator 4 preferably comprises a second cylinder and plunger assembly 4a,4b that may be moved with respect to each other in order to define therein a chamber 4c for holding the gaseous fluid. The chamber 4c is thus of varying size, thereby providing a compression of the enclosed fluid upon reducing the size of the chamber.

The cylinder 4a of the second cylinder and plunger assembly 4a,4b is preferably coaxially placed inside the cylinder 1a of the first cylinder and plunger assembly 1a,1b. The plunger 1b of the first assembly 1a,1b is preferably susceptible of retracting inside its cylinder 1a to move the cylinder 4a of the second assembly 4a,4b while the plunger 4b of the second assembly preferably remains fixed to compress the fluid inside the chamber 4c.

A diameter of the plunger 1b of the first assembly 1a,1b may be between 15 and 50 mm, for example, 34 mm. The stroke of the plunger may be between 30 and 80 mm such as for example 50 mm. The diameter of the cylinder 4a of the second assembly is slightly lower than the diameter of the plunger 1b of the first assembly so as to coaxially fit inside the plunger 1b. The plunger 1b and cylinder 4a can also be the same element (e.g. for reduction of parts). In order to vary the volume of the pressurizing liquid chamber 1, the stroke and/or diameter of the plunger assembly 4a, 4b can be varied. By varying the stroke only, the pressure of liquid delivered to the brewing chamber remains unchanged. By varying the diameter, the pressure of liquid delivered to the brewing chamber can be modified accordingly so as to adapt the machine to different types of beverages and/or capsules. This can also be made by adapting the gas pressure or spring load of the energy accumulator.

In a variant (not illustrated), the cylinder 4a can be fixed to the housing of the device and the plunger 4b can be the mobile part relative to the cylinder. In this case, the plunger 4b can be arranged, to be at one end, the plunger of the accumulator and at the opposite end to also form the plunger 1b of the pressurized water chamber.

The reservoir 3, the liquid pump 2, the pressurizing liquid chamber 1 and the brewing chamber 5 are preferably in fluid connection. For this purpose, the machine 20 comprises dedicated fluid circuit, e.g. formed by dedicated conduits 17 interconnecting the respective parts 1,2,3,5.

The machine 20 further comprises flow control means 6a,6b designed for regulating the amount of liquid conveyed from the liquid pump 2 into the pressurizing liquid chamber 1 depending on an operating position of the potential energy accumulator 4. The flow control means 6a,6b preferably comprise at least two modes, wherein in a first mode liquid is conveyed from the pump 2 into the pressurizing chamber 1 and a second mode in which the liquid is conveyed back from the pump to the liquid reservoir 3. Accordingly, the movement of the lever arrangement 9 connected to the pump 2 is still enabled even when the pressurizing chamber 1 is in its filled state while the pressure in the fluidic line and the mechanical forces on the lever(s) are low.

The flow control means 6a,6b comprise a system of two valves 6a,6b arranged in the fluid circuit between the liquid reservoir 3 and the pressurizing chamber 1, whereby the first valve 6a is situated in a fluid path between the pump 2 and the liquid reservoir 3 and the second valve 6b is situated in the fluid path between the first valve 6a and the pressurizing liquid chamber 1.

Figure 3A:
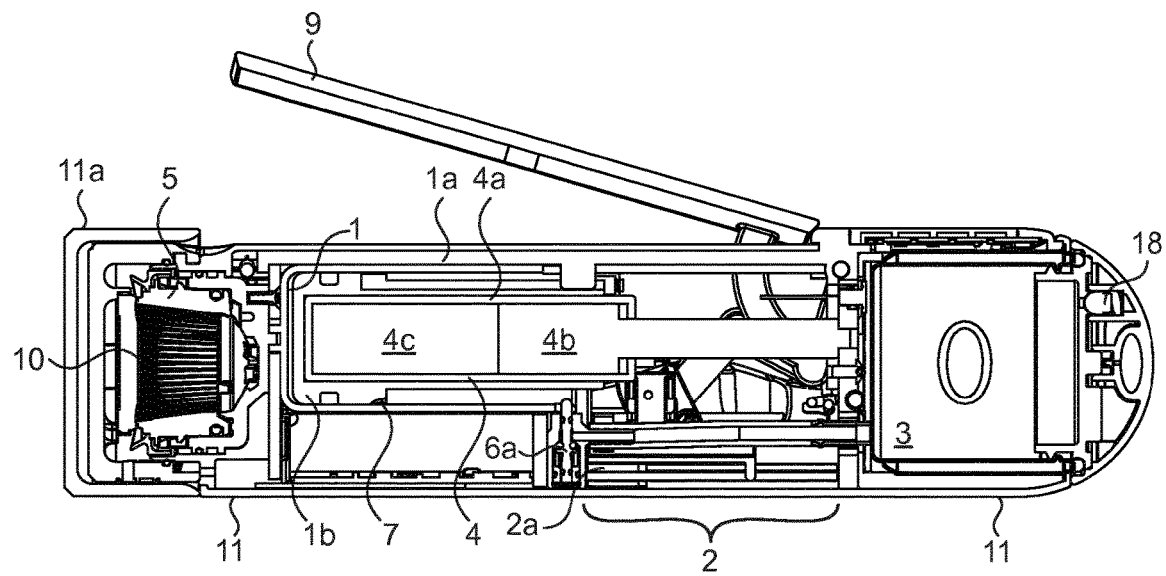
FIGS. 3a and 3b are sectional side views of a first empty state and a second filled state of the pressurizing liquid chamber of the machine corresponding to a non-charged (released) state and a charged (compressed) state of the potential energy accumulator.
Figure 3B:
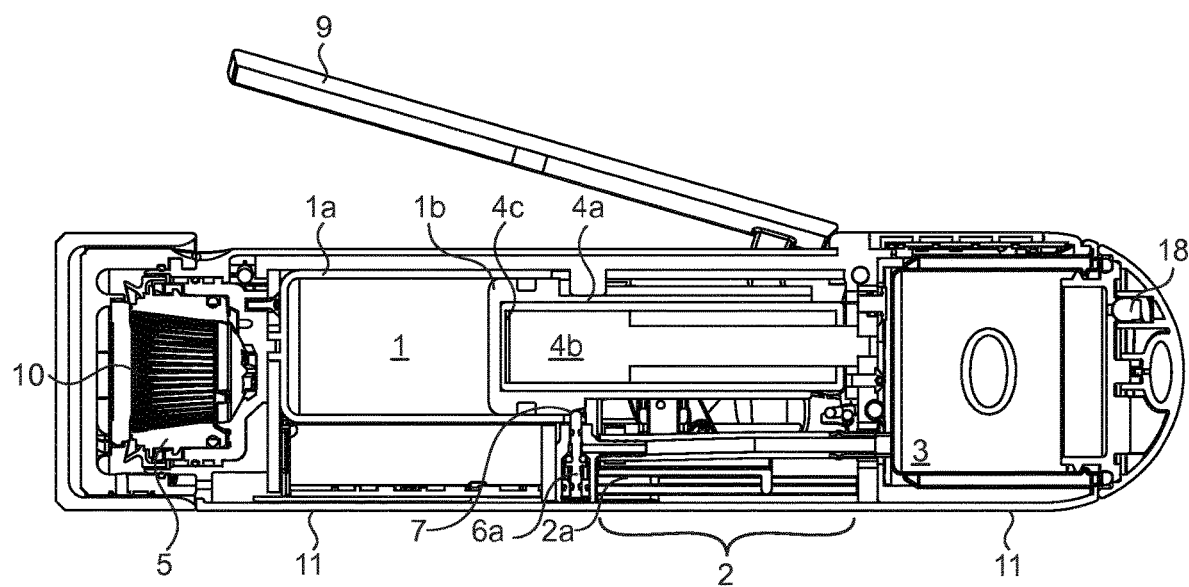

As e.g. shown in FIGS. 2 and 3a, the first valve 6a is preferably arranged in a T-junction of the fluid circuit interconnecting the pump 2, a connector 14 for connecting to the liquid reservoir 3 and a connector 15 for connecting to the pressurizing liquid chamber 1. The connector 15 may be connected to the pressurizing liquid chamber 1by means of a tubular member 17 and a dedicated connector 16 of the liquid chamber 1. The second valve 6b is preferably arranged in the fluid path from the first valve 6a to the pressurizing liquid chamber 1. The second valve 6b may e.g. be situated inside or in vicinity of the connector 15.

The operation of the flow control means 6a,6b during the operation of the pump will be described in detail in the following with respect to FIGS. 4a,b and 5a,5b.

Figure 4A:
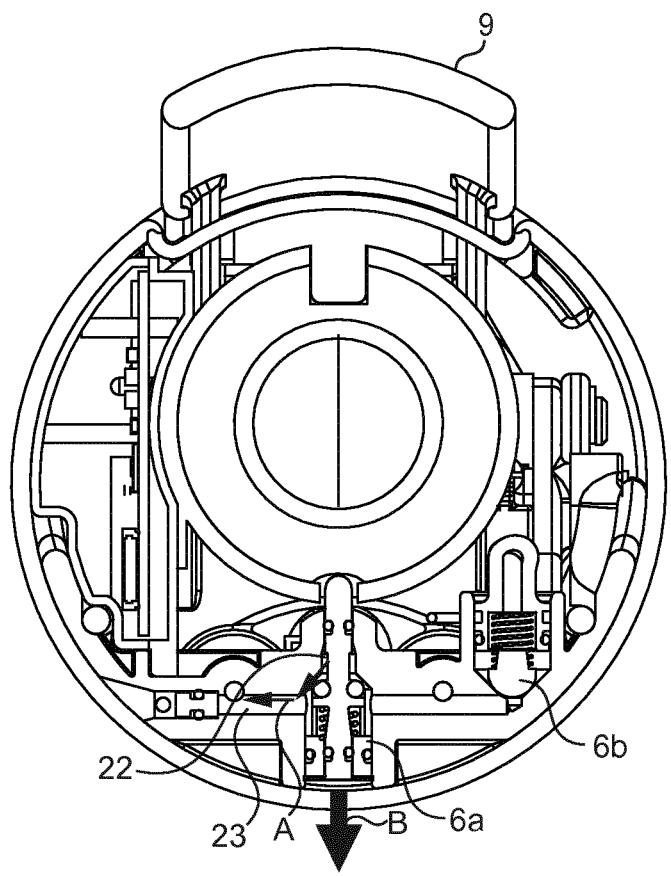
FIGS. 4a and 4b are cross sectional views of the machine upon a first step of the filling operation of the pressurizing liquid chamber in which liquid is drawn from the liquid reservoir to the pump.
Figure 4B:
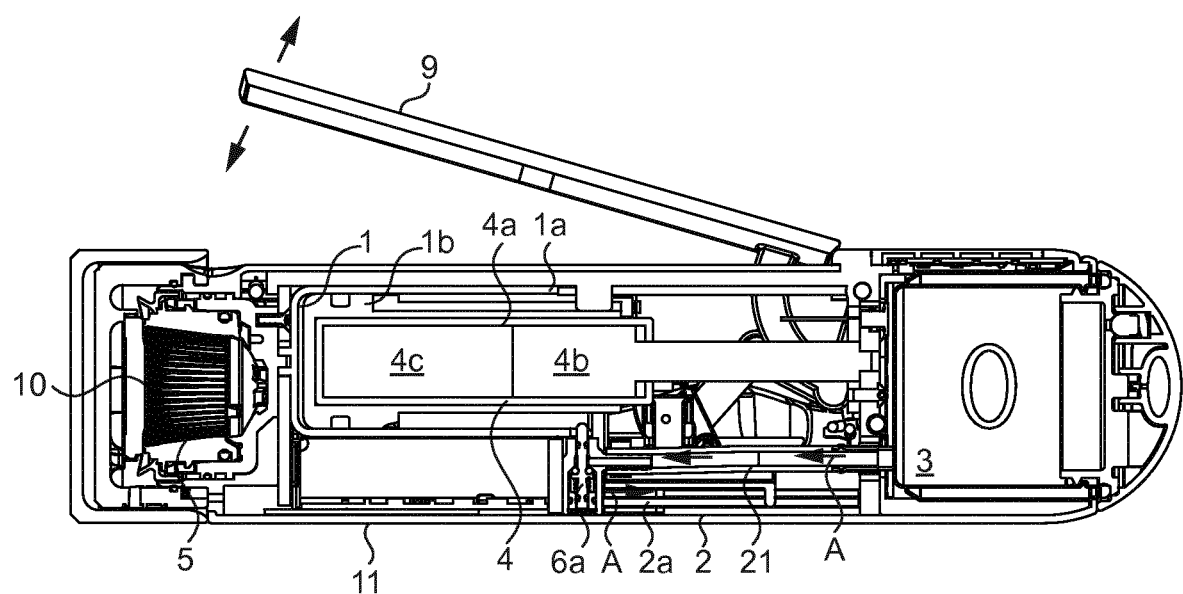

FIGS. 4a and 4b relate to an initial state of the beverage preparation machine, wherein an unused/new capsule 10 has been placed into the brewing chamber 5 and wherein the pressurizing liquid chamber 1 is in its empty state. Consequently, the energy accumulator 4 is in its non-charged state.

In a first step of a reciprocating movement of the lever arrangement 9, liquid is first conveyed from the liquid reservoir 3 to the valve 6a via a conduit 21 (see arrows A), a passage or conduit 22 in which a pin 25 of the valve 6a is guided and a conduit 23 between the valve 6a and the pump. The valve 6a is thereby opened (see arrow B in FIG. 4a) by the depression caused in the liquid pump 2, thus enabling liquid to pass the valve 6a, in particular in the conduit 22 in which the pin 25 is guided.

Figure 5A:
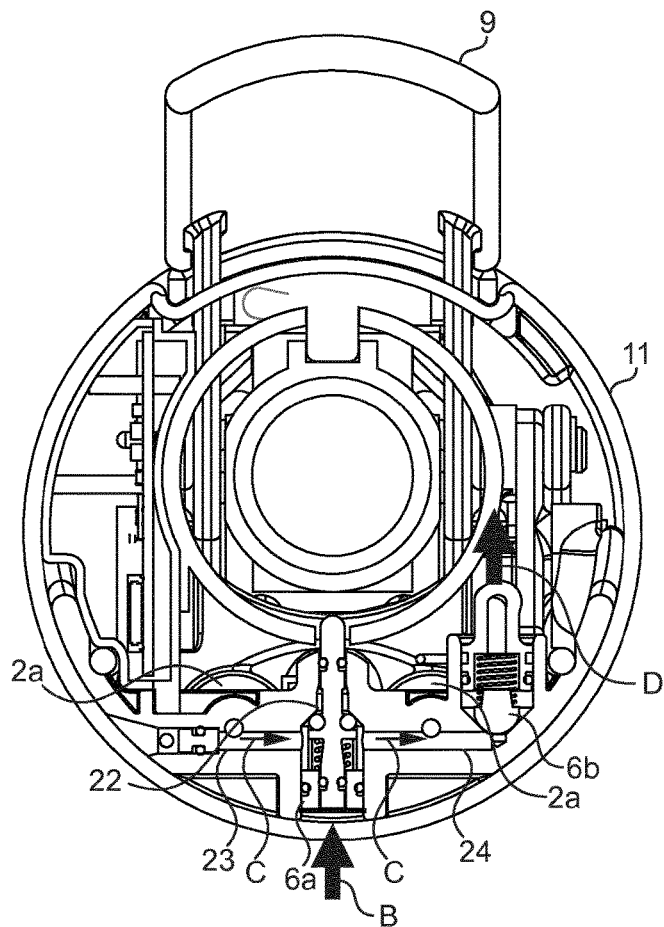
FIGS. 5a and 5b are cross sectional views of the machine upon a second step of the filling operation of the pressurizing liquid chamber in which liquid is conveyed from the pump to the pressurizing liquid chamber.
Figure 5B:
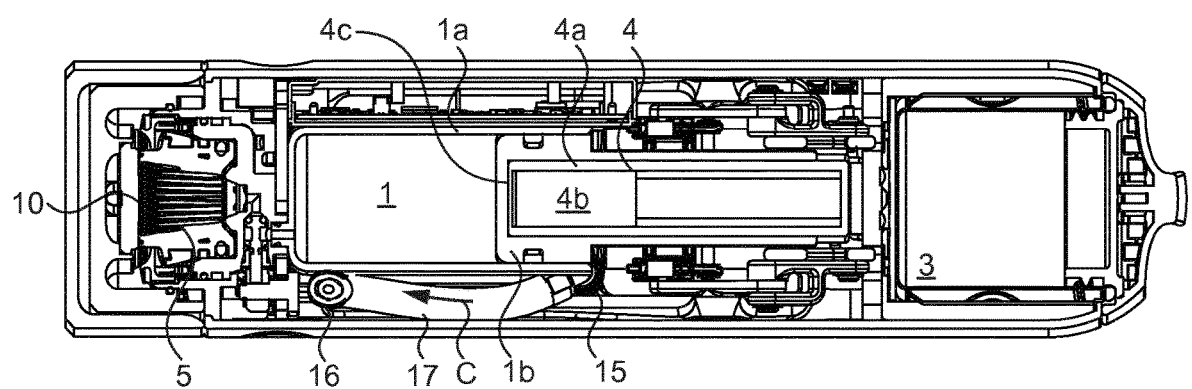

During further operating the lever arrangement 9 in a second step, preferably in the opposite direction as in the first step shown in FIGS. 4 and 4b, a pressure step is carried out by the pump 2. In this step, water is expulsed from the cylinders 2a of the pump 2 to the pressurizing liquid chamber 1. Thereby, due to the pressure applied in the conduit 22 by the pump 2 and as no sufficient counter pressure is present in conduit 22 in which the pin 25 of the valve 6a is guided, the valve 6a remains in its closed (normal) position, thus closing the conduit 22 (see arrow B). The liquid flow (see arrows C) applied in conduits 23,24 thus lead to an opening of the second valve 6b (see arrow D) in order to enable a fluid communication between the pump 2 and the pressurizing liquid chamber 1 (see also arrow C in FIG. 5b). The second valve 6b is preferably a check valve which enables a fluid communication from conduit 24 to the pressurizing liquid chamber 1 only.

Figure 6A:
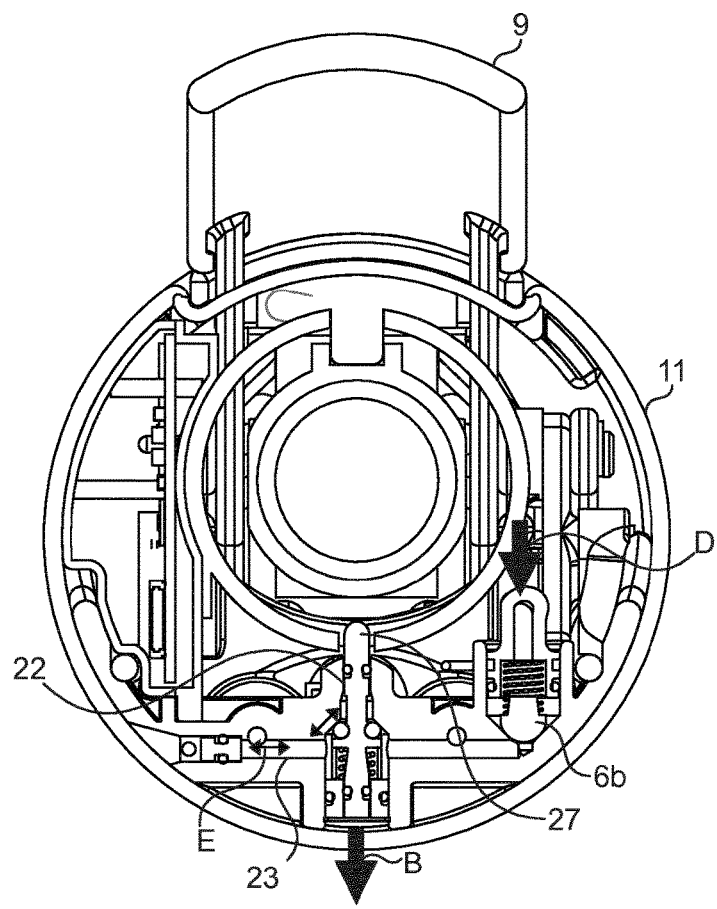
FIGS. 6a and 6b are cross sectional views of the machine in the filled state of the pressurizing liquid chamber and show the liquid flow upon further operation of the pump in this state.
Figure 6B:
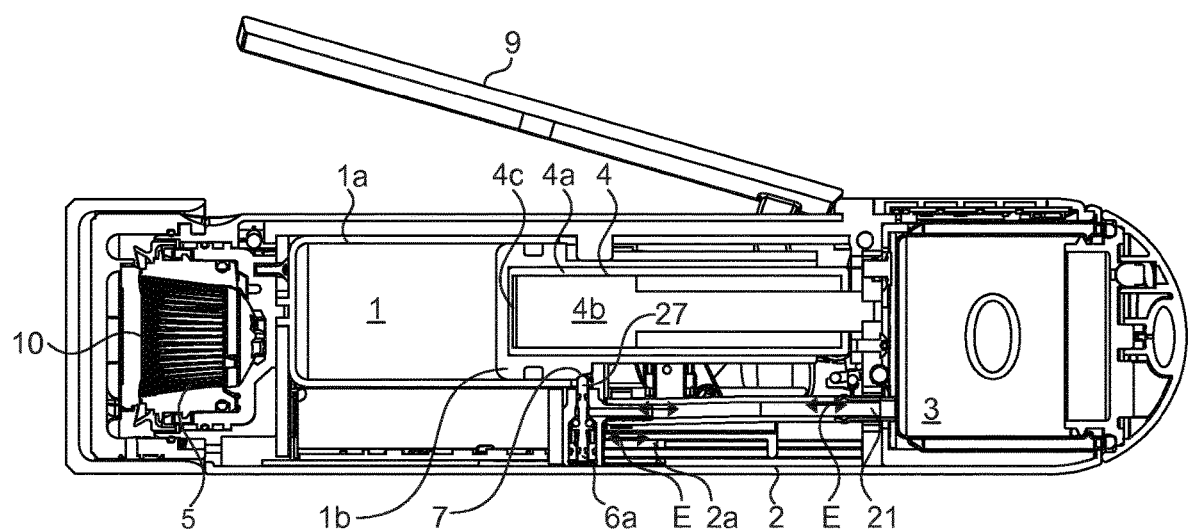

The first and second steps as shown in FIGS. 4a,4b and 5a,5b are preferably continuously carried out during the reciprocating movement of the lever arrangement 9 and thus during the operation of the pump 2 (e.g. reciprocal movement of the cylinder(s) 2a), such as to continuously fill the liquid chamber 1 and simultaneous charge the energy accumulator 4. This is carried out, until the pressurizing liquid chamber 1 is brought to its (completely) filled state as shown in FIG. 6a,6b and in which state the energy accumulator 4 is in its charged position.

In this configuration of the machine 20, the first valve 6a is held in a forced open position. This is preferably obtained by a dedicated engagement surface 7 engaging the valve pinhead 27 upon reaching the charged position of the energy accumulator 4. The engagement surface 7 is preferably arranged at an outer lateral surface of the plunger 1b of the first cylinder and plunger assembly 1a,1b. The engagement surface 7 may be a sloped or curved surface gradually engaging with the pinhead 27 of the valve 6a upon reaching the charged position of the accumulator and the forced open position of the valve 6a.

In this open position of first valve 6a, liquid can only travel from the liquid reservoir 3 to the liquid pump 2 back and forth (see arrow E) in conduits 21,22,23 during operation of the lever arrangement 9 and reciprocating pumping operation of the pump. Thereby, the second valve 6b remains in its (normal) closed position because there is no sufficient pressure in the conduit 24 which would lead to an opening of the second valve 6b. As a consequence, the lever arrangement 9 can be moved up and down and placed back in rest position by the user of the machine 20. The pressurizing liquid chamber 1 is full, the energy accumulator 4 is in its charged position and the machine 20 is thus ready for liquid dispensing to the brewing chamber 5.

In order to selectively provide liquid under pressure from the pressurizing liquid chamber 1 to the brewing chamber 5, the machine 20 further comprises a liquid release valve 12 (see FIG. 7a) arranged between the pressurizing liquid chamber 1 and the brewing chamber 5. The user may thus open the liquid release valve 12, e.g. by means of pressing an activation button 12b (see FIG. 7b) arranged on a surface of the housing 11 of the machine. Liquid under pressure will then be provided from the pressurizing liquid chamber 1 to the brewing chamber 5 and thus to the capsule held 10 therein, e.g. via a conduit 12a interconnecting these parts. The resulting beverage may then be drained from an outlet aperture (not shown) of the machine 20 into a receptacle.

In a preferred embodiment of the invention, the position of the energy accumulator 4 and/or of the plunger 1b of the pressurizing chamber may also be controlled by a position sensors in order to provide an accurate feedback regarding an empty and filled state of the pressurizing liquid chamber 1. The position sensors may comprise or consist of Hall sensors.

The machine 20 may further comprise a control unit designed to control the electrical activation of the release button 12 such as to be activated only when certain parameters are fulfilled such as the water chamber being filled and the temperature of liquid being within predefined target values.

Figure 8A:
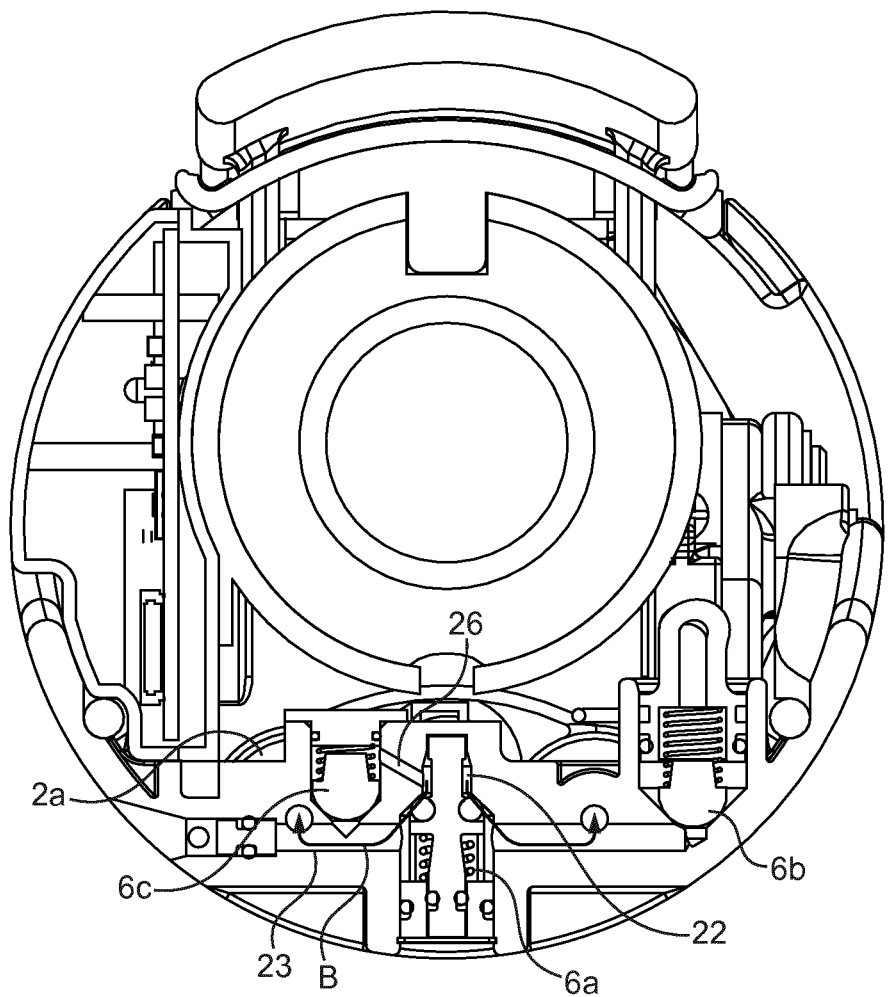
FIGS. 8a and 8b are cross sectional side views of the machine according to a variant of the invention and shows a filling step of the pressurized chamber through the second valve.

FIG. 8a represents a variant of the machine of the invention. The machine comprises the same technical means as in the previous embodiment except for the engagement surface 7 which is replaced by a third valve 6c. In the charging step of the liquid pump 2, the cylinders 2a are moved to draw liquid from the liquid reservoir 3 (direction B). As in FIG. 4a, the first valve 6a opens by pressure difference and liquid flows from the liquid reservoir to the conduit 21, the passage 22 and to the conduit 23 to fill the cylinders 2a. A third valve 6c is present which may be positioned to bypass the valve 6a and by fluidly connecting the conduit 23 downstream the first valve 6a to the conduit 21 upstream the valve 6a. The third valve 6c is arranged as a one-way valve such that liquid cannot flow from the liquid reservoir to the cylinder but only in the opposite direction, i.e., from the cylinder to the liquid reservoir via a small conduit 26.

Figure 8B:
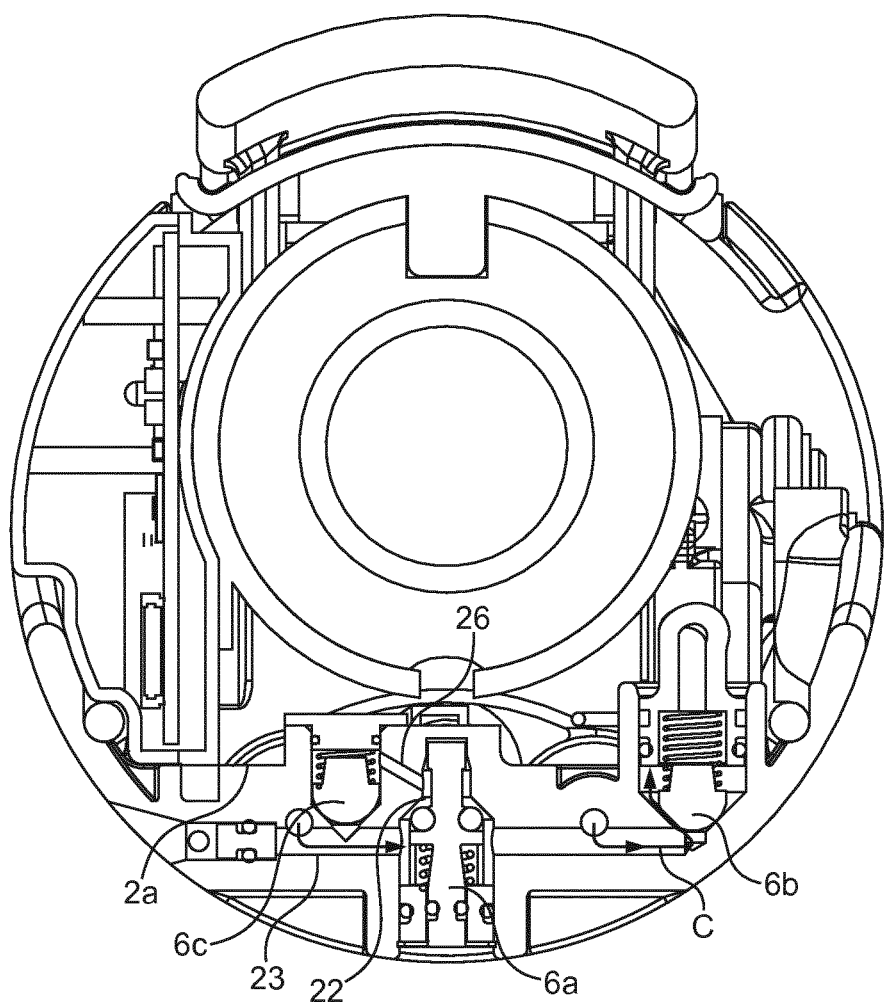

As shown in FIG. 8b, the liquid flow is not possible at the filling pressure of the pressurized chamber 1 such that only the second valve 6b can open as illustrated in FIG. 8a. For this, the third valve 6c is loaded with a spring load which is set higher than the spring load of the second valve 6b leading to the pressurized chamber 1. When the liquid pump reciprocates, the cylinders 2a are moved to expel liquid towards the conduit 23 which so opens the second valve 6b to fill the pressurized chamber 1 (direction C). The first valve 6a and 6c both remain closed.

Figure 8C:
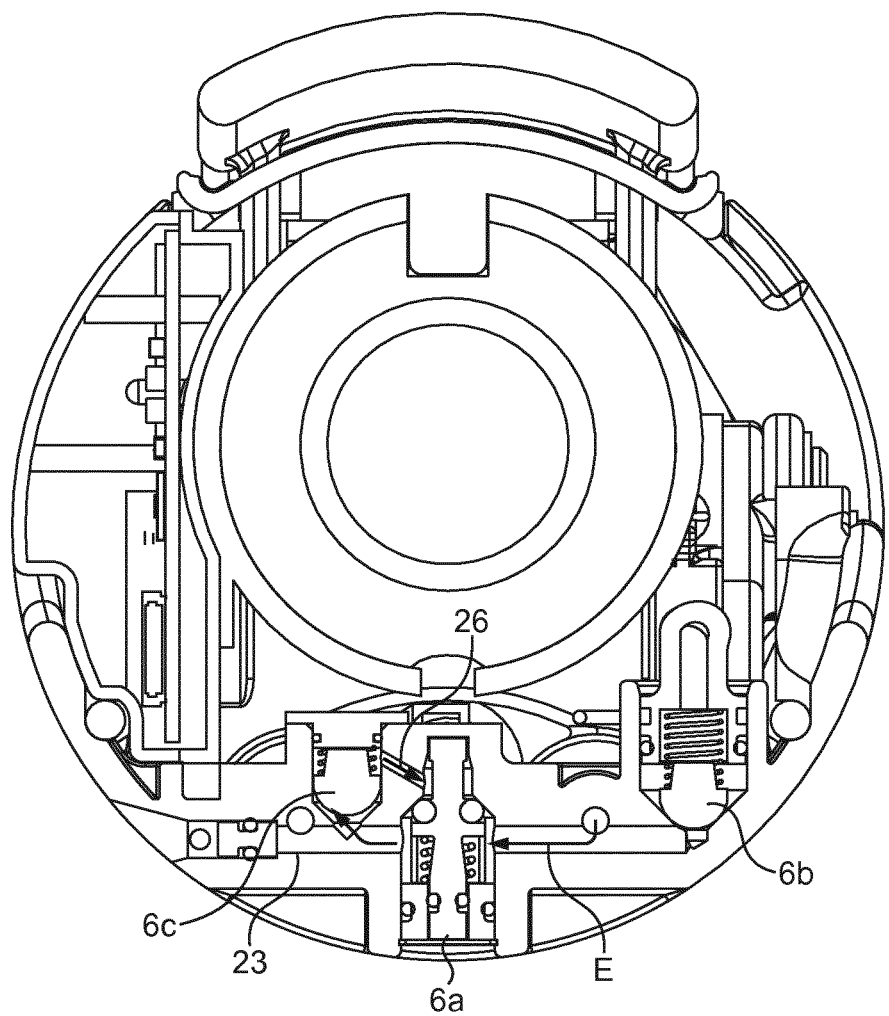
FIG. 8c are a cross sectional side views of the machine according to the variant of FIGS. 8a and 8b in the filled state of the pressurizing liquid chamber and show the liquid flow upon further operation of the pump in this state.

The charging and filling steps of FIGS. 8a and 8b go on until the pressurized chamber is filled. In the charged state of the pressurized chamber 1, the liquid is recirculated by the first valve 6a (FIG. 8a) and third valve 6c (FIG. 8c) as shown by direction E. The reciprocation of the liquid pump provides a recirculation of liquid to the liquid reservoir 1 by the third valve 6c opening. No more liquid can circulate through the second valve 6b and the pressure in the conduit 23 becomes sufficiently high to open third valve 6c and to maintain it opened. Liquid passes through the third valve 6c and through conduit 26, passage 22 back to the liquid reservoir 3. The next step starts again by drawing liquid in the cylinders 2a via the first valve 6a opening.

Therefore, contrary to the former embodiment, in this one, the recirculation is not obtained by forcing the first valve opened in the return direction of liquid based on the filled position of the pressurized chamber 1, but by providing a third valve which arranged opposite the first valve and which by-passes it in direction from the liquid pump to the liquid reservoir 3 and opening depending on the pressure of liquid between the liquid pump and the pressurized chamber 1. When the pressure of liquid, in particular in the conduit 23, reaches a threshold value corresponding to a maximum filling level of the pressurized chamber 1, the recirculation or third valve 6c opens to allow liquid to return to the liquid reservoir via conduit 26 upstream the first valve 6a.

It should be noted that the third valve 6c can be provided inside the pin of the first valve 6a with a central liquid through-hole, as another constructional arrangement, but still opening in the opposite direction as to the first valve in relation to its passage 22.

The invention claimed is:

1. A beverage preparation machine for providing a pressurized liquid to a dose of beverage ingredients, the beverage preparation machine comprising:

a pressurizing liquid chamber configured for being filled with liquid upon operation of a liquid pump connected to a liquid reservoir of the beverage preparation machine;

a potential energy accumulator associated with the pressurizing liquid chamber, the potential energy accumulator configured to move between a charged position and a non-charged position, wherein the potential energy accumulator is configured to move into the charged position upon filling of the pressurizing liquid chamber;

a brewing chamber configured for receiving the dose of beverage ingredients, the brewing chamber configured for being brought into fluid communication with the pressurizing liquid chamber;

a flow control configured for regulating the liquid conveyed from the liquid pump into the pressurizing liquid chamber according to at least two flow control modes depending on the charged position or the non-charged position of the potential energy accumulator; and the at least two flow control modes comprise a first flow control mode in which the liquid is conveyed from the liquid pump into the pressurizing liquid chamber when the potential energy accumulator is in the non-charged position and a second flow control mode in which the liquid is conveyed from the liquid pump back into the liquid reservoir when the potential energy accumulator is in the charged position;

wherein the flow control comprises a first valve and a second valve arranged in a fluid path between the liquid reservoir and the pressurizing liquid chamber, the first valve being positioned between the liquid pump and the liquid reservoir, the second valve being positioned between the first valve and the pressurizing liquid chamber, and wherein the second valve is a check valve; and wherein the flow control comprises a third valve positioned to bypass the first valve by fluidly connecting a conduit downstream the first valve to a conduit upstream the first valve, wherein the second valve is configured to open while the first valve and the third valve are closed when the pressurized liquid chamber is filled, the third valve configured to direct the liquid back to the liquid reservoir when:

a pressure between the liquid pump and the pressurizing liquid chamber exceeds a predetermined threshold; or the potential energy accumulator is in the charged position.

2. The beverage preparation machine according to claim 1, wherein the flow control is configured to enable operation of the liquid pump without further filling of the pressurizing liquid chamber when the potential energy accumulator is in the charged position.

3. The beverage preparation machine according to claim 1, wherein operating positions of the potential energy accumulator comprise the charged position and at least a non-charged position.

4. The beverage preparation machine according to claim 1, wherein the first valve is configured for being selectively engaged and held in a forced open position when the potential energy accumulator is in the charged position.

5. The beverage preparation machine according to claim 4, wherein the forced open position of the first valve enables a fluid communication solely between the liquid reservoir and the liquid pump.

6. The beverage preparation machine according to claim 4, wherein the first valve is configured for being engaged and held in the forced open position by an engagement surface of a plunger of at least one of the pressurizing liquid chamber or the potential energy accumulator.

7. The beverage preparation machine according to claim 1, wherein the third valve is a one-way valve configured to by-pass the first valve in a direction towards the liquid reservoir.

8. The beverage preparation machine according to claim 1, wherein the liquid pump is configured for being driven by a manually operated lever arrangement.

9. The beverage preparation machine according to claim 8, wherein the manually operated lever arrangement is configured for operating the liquid pump by a reciprocating movement of the manually operated lever arrangement with respect to a housing of the beverage preparation machine.

10. The beverage preparation machine according to claim 8, wherein the manually operated lever arrangement is fixedly connected to the liquid pump.

11. The beverage preparation machine according to claim 1, wherein the beverage preparation machine further comprises a release valve arranged between the pressurizing liquid chamber and the brewing chamber, the release valve configured for selectively releasing pressurized water from the pressurizing liquid chamber to the brewing chamber.

* * * * *